(No Model.)
J. C. MULLINS.
APPARATUS FOR TRIMMING HOOFS OF ANIMALS.
No. 290,089. Patented Dec. 11, 1883.
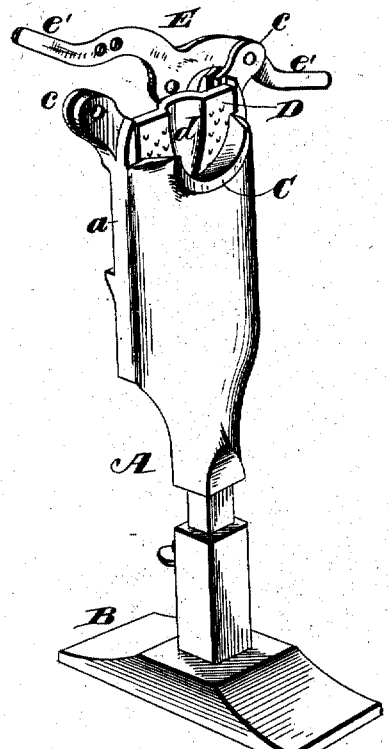
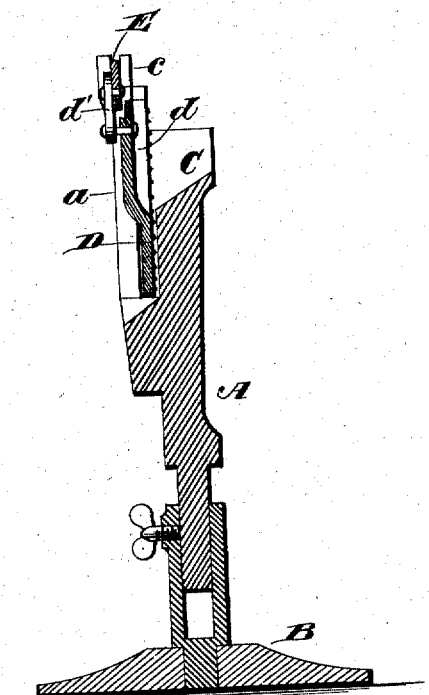
Witnesses.
Robert Everett
Chas. J. Fryer
Inventor.
Joshua C. Mullins.
By James L. Norris.
Atty.

UNITED STATES PATENT OFFICE.

JOSHUA C. MULLINS, OF WHITNEY, ASSIGNOR TO MODEL MACHINE COMPANY, OF WACO, TEXAS.

APPARATUS FOR TRIMMING HOOFS OF ANIMALS.

SPECIFICATION forming part of Letters Patent No. 290,089, dated December 11, 1883.

Application filed October 29, 1883. (No model.)

*To all whom it may concern:*

Be it known that I, JOSHUA C. MULLINS, a citizen of the United States, residing at Whitney, in the county of Hill and State of Texas, have invented new and useful Improvements in Apparatus for Trimming Hoofs of Animals, of which the following is a specification.

My invention relates to hoof-trimmers for shaping and trimming the hoofs of animals, the purpose being to provide a cheap, simple, and easily-operated device, which may be used upon either side of the animal and without injury to the frog of the foot, for the purpose of trimming and paring the hoof to receive the shoe.

To this end, therefore, my invention consists in an upright standard or support having a concaved supporting-recess adapted to receive the animal's hoof, with parallel guide-ways arranged in rear thereof, a trimming implement moving in said guides, and so constructed as to operate upon the hoof without injury to the frog, and means for reciprocating the trimming device from either side of the animal.

My invention also consists in the several novel features of construction and combinations of parts hereinafter set forth, and pointed out in the claims annexed to this specification.

Referring to the drawings, Figure 1 is a perspective view, illustrating my invention. Fig. 2 is a central vertical section of Fig. 1. Fig. 3 is a detail elevation of the trimming implement detached. Fig. 4 is a rear elevation, the adjustability of the actuating-lever upon either side thereof being shown in dotted lines.

The letter A in said drawings designates an upright standard or support of any suitable material, mounted upon a base, B, having sufficient breadth and solidity to give support to said standard and its attachments. The upper end of this standard is provided with an enlarged or thickened portion, within which is formed a support, C, for the hoof of the animal, having the required concavity, and inclined to such a degree that when supported therein the bottom of the hoof, or that portion to which the shoe is applied, shall lie in a vertical plane, or practically so, in front of and against the trimming-instrument.

Upon the rear face of the standard A, I form or attach guides $a\ a$, in which reciprocates vertically the trimming implement D, which may be either the ordinary rasp or a cutter, with the exception that in the center of the said implement I form a recess or depression, $d$, having a width equal to that of the frog upon the foot of a horse, ox, or other animal, in order to prevent all possible injury to or wounding of the sensitive part of the foot.

The trimmer D is actuated in the guides $a\ a$ by means of a lever, E, pivoted to either one of two lugs or ears, $c\ c$, formed upon each side of the guides $a\ a$. This lever is connected with the trimming implement by means of a toggle, $d'$, attached to said lever at or about its center.

It will be seen that the actuating lever is provided with a grasp or handle, $e'$, at each end, and has between each grasp and the toggle-link $d'$ one or more perforations, $f$, by which it may be connected with either one of the lugs $c\ c$. By this means, as will readily be perceived, I am not only able to use the trimming-instrument upon both the off and the near side of the animal without the danger or inconvenience of the lever E coming in contact with the belly when used upon the fore feet; but I am, moreover, enabled to adjust the fulcrum-point toward and from the toggle-link, whereby I may, with the same force applied to the lever, multiply the power of the trimming-tool to any degree practically necessary.

Heretofore, and prior to my invention, a trimming device has been used having a vertical frame mounted on a platform, to which is attached a post having a lever pivoted thereon, which is supported in an elevated position by a spring, said lever being connected by a pitman to a reciprocating carriage carrying a paring-knife. I am also aware that a paring-knife has been operated by means of a lever pivoted directly thereto and having a fulcrum-point upon a toggle-bar upon the platform or base. It will readily be seen, however, that with such a construction the lever cannot be shifted so as to throw the grasp upon either side, as in mine, in which the toggle-connection is in the center of the lever and the fulcrum-pin applicable at either end. This is a most important feature, as without it the device could not well be used in trimming the hoofs of the fore feet. Moreover, in no instance with which I am acquainted, has a trimming implement been provided having such a construction that it will not injure the frog of the foot while cutting or paring the hoof.

Having thus described my invention, what I claim is—

1. In an apparatus for paring and trimming hoofs, a trimming implement reciprocating in rear of a suitable foot-support, and having a central longitudinal depression or channel, to avoid injury to the frog of the foot, substantially as described.

2. In an apparatus for trimming hoofs, the combination, with a reciprocating paring and trimming implement and a suitable foot-support, of an actuating-lever connected therewith by a central toggle, and having a grasp at each end, with attaching-perforations near each end, substantially as described.

3. The combination, with the upright A, having an inclined concaved foot-support, C, of the trimming implement D, the double-ended lever E, having perforations $f$, and the attaching-lugs $c\ c$, upon each side of the standard, substantially as described.

4. The combination, with the standards A, having base B, of the guides $a\ a$, the trimming-tool D, reciprocating therein, and having a central channel or recess, $d$, the double-end lever E, pivoted interchangeably to either of the lugs $c\ c$, and the central toggle connecting said lever with the trimming-tool, substantially as described.

In testimony whereof I have hereunto set my hand in the presence of two subscribing witnesses.

JOSHUA C. MULLINS.

Witnesses:
C. W. D. COOKE,
W. T. MOORE.

It is hereby certified that Letters Patent No. 290,089, granted December 11, 1883, upon the application of Joshua C. Mullins of Whitney, Texas, for an improvement in "Apparatus for Trimming Hoofs of Animals" was erroneously issued to the "Model Machine Company of Waco, Texas," as assignee of the entire interest in said invention; that said Letters Patent should have been issued to *Joshua C. Mullins* and the *Model Machine Company* as joint owners; and that the proper correction has been made in the files and records pertaining to the case in the Patent Office, and should be read in the patent to make it conform thereto.

Signed, countersigned, and sealed this 25th day of December, A. D. 1883.

[SEAL.]

M. L. JOSLYN,
*Acting Secretary of the Interior.*

Countersigned:

BENJ. BUTTERWORTH,
*Commissioner of Patents.*